(12) United States Patent
Haefner et al.

(10) Patent No.: US 9,556,835 B2
(45) Date of Patent: Jan. 31, 2017

(54) INTAKE MODULE FOR AN INTERNAL COMBUSTION ENGINE

(75) Inventors: Jochen Haefner, Lorch (DE); Cecile Jecker, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/352,598

(22) PCT Filed: Sep. 5, 2012

(86) PCT No.: PCT/EP2012/003710
§ 371 (c)(1),
(2), (4) Date: Apr. 17, 2014

(87) PCT Pub. No.: WO2013/056763
PCT Pub. Date: Apr. 25, 2013

(65) Prior Publication Data
US 2014/0245982 A1    Sep. 4, 2014

(30) Foreign Application Priority Data

Oct. 18, 2011   (DE) .................. 10 2011 116 299

(51) Int. Cl.
*F02M 35/104*   (2006.01)
*F02M 35/10*    (2006.01)
(Continued)

(52) U.S. Cl.
CPC ......... *F02M 35/104* (2013.01); *F01M 13/022* (2013.01); *F01M 13/0416* (2013.01);
(Continued)

(58) Field of Classification Search
CPC .............. F01M 11/08; F01M 2013/027; F01M 2013/0411; F02B 29/04; F02B 29/0475; F01P 2060/02; F02M 35/10078; F02M 25/0726; F02M 35/10288; F02M 35/104
(Continued)

(56) References Cited

U.S. PATENT DOCUMENTS 4,898,125 A   2/1990   Ampferer
5,005,553 A   4/1991   Washizu et al.
(Continued)

FOREIGN PATENT DOCUMENTS

DE         37 30 817 C2    3/1989
DE    10 2009 020 100 A1   11/2010
(Continued)

OTHER PUBLICATIONS

International Search Report (PCT/ISA/210) with English translation dated Dec. 13, 2012 (Five (5) pages).
(Continued)

*Primary Examiner* — Long T Tran
(74) *Attorney, Agent, or Firm* — Crowell & Moring LLP

(57) ABSTRACT

An intake module an internal combustion engine of a motor vehicle includes at least one air duct element via which air is to be supplied to the internal combustion engine, and a cylinder head cover connected to the air duct element by means of which a cylinder head of the internal combustion engine is to be at least partially covered. A lubricant separation device and a cooling device for cooling the air are integrated into the intake module.

14 Claims, 1 Drawing Sheet

(51) Int. Cl.
*F02B 29/04* (2006.01)
*F01M 13/04* (2006.01)
*F01M 13/02* (2006.01)
*F02M 25/06* (2016.01)

(52) U.S. Cl.
CPC ... *F02B 29/0475* (2013.01); *F02M 35/10222* (2013.01); *F02M 35/10268* (2013.01); *F02M 35/10354* (2013.01); *F01M 2013/0411* (2013.01); *F02M 25/06* (2013.01); *Y02T 10/146* (2013.01)

(58) Field of Classification Search
USPC ............... 123/184.21, 184.27, 193.5, 193.3
See application file for complete search history.

(56) References Cited

U.S. PATENT DOCUMENTS

| | | | | |
|---|---|---|---|---|
| 5,220,889 | A * | 6/1993 | Ampferer | F02M 35/116 123/184.21 |
| 6,526,933 | B2 * | 3/2003 | Iizuka | F02B 75/20 123/184.24 |
| 6,532,914 | B2 * | 3/2003 | Washizu | F01L 1/0532 123/41.41 |
| 7,631,639 | B2 * | 12/2009 | Yonebayashi | F01M 13/0416 123/572 |
| 7,849,683 | B2 * | 12/2010 | Asame | F02F 1/243 123/193.1 |
| 8,291,880 | B2 * | 10/2012 | Hafner | F01N 13/10 123/193.3 |
| 8,365,695 | B2 * | 2/2013 | Wakamatsu | F02M 35/10085 123/184.21 |
| 2013/0180507 | A1 * | 7/2013 | Nakasugi | F02B 29/0437 123/542 |

FOREIGN PATENT DOCUMENTS

| | | |
|---|---|---|
| EP | 0 448 431 A1 | 9/1991 |
| EP | 0 471 886 A1 | 2/1992 |
| EP | 1 182 343 A2 | 2/2002 |
| EP | 2 253 829 A1 | 11/2010 |
| JP | 61223214 A * | 10/1986 |
| JP | 3-53451 B2 | 8/1991 |
| JP | 7-97965 A | 4/1995 |
| JP | 11-159410 A | 6/1999 |
| JP | 11-182368 A | 7/1999 |
| JP | 2004-108156 A | 4/2004 |
| JP | 2008-106627 A | 5/2008 |
| JP | 2011-190744 A | 9/2011 |

OTHER PUBLICATIONS

German language Written Opinion (PCT/ISA/237) dated Dec. 13, 2012 (Five (5) pages).
Partial English Translation of Office Action from Japanese Patent Office (Four (4) pages), mailed May 12, 2015.

* cited by examiner

INTAKE MODULE FOR AN INTERNAL COMBUSTION ENGINE

CROSS-REFERENCE TO RELATED APPLICATION

The present application is related to PCT/EP2012/003709, filed Sep. 5, 2012, a national stage application of which is filed as U.S. application Ser. No. 14/352,604, on even date herewith.

BACKGROUND AND SUMMARY OF THE INVENTION

Exemplary embodiments of the present invention relate to an intake module for an internal combustion engine.

German patent document DE 37 30817 C2 discloses a cylinder head cover together with an intake manifold system for an internal combustion engine having a four-stroke reciprocating piston design, which form an integral unit. The cylinder head cover of this integral unit is mounted on a cylinder head of the internal combustion engine by means of a seal and by screws. The screws are screwed into heads of coaxially situated fastening screws, which hold the multi-part cylinder head in position.

German patent document DE 10 2009 020 100 A1 discloses a cylinder head for an internal combustion engine having a cylinder head cover connected to the cylinder head via a sealing surface. An intake module as well as an exhaust gas module are provided, each of which is connected to the cylinder head via a corresponding sealing flange surface. The sealing surface between the cylinder head and the cylinder head cover is integrated into the respective sealing flange surface of the intake module and/or of the exhaust gas module.

It is also known from the series production of internal combustion engines that a considerable number of components of the internal combustion engine are necessary to allow efficient, low-emission operation of the internal combustion engine. This large number of components requires a complicated assembly, resulting in time-consuming and costly assembly of the overall internal combustion engine.

Exemplary embodiments of the present invention are directed to an intake module for an internal combustion engine, in particular a motor vehicle, by means of which the assembly costs of the internal combustion engine may be kept particularly low.

Such an intake module for an internal combustion engine, in particular a motor vehicle, includes at least one air duct element via which the internal combustion engine is to be supplied with air. The intake module also includes a cylinder head cover, connected to the air duct element, by means of which a cylinder head of the internal combustion engine is to be at least partially covered.

According to the invention, a lubricant separation device and a cooling device for cooling the air are integrated into the intake module. This means that the air duct element, the cylinder head cover, the lubricant separation device, and the cooling device form a modular part in the form of the intake module, and as the intake module may be installed on the internal combustion engine, and thus in the rest of the motor vehicle, in a particularly time- and cost-effective manner.

The intake module may be at least partially preassembled as the modular component at the same time as the production of the rest of the internal combustion engine, and installed as a preassembled intake module in the internal combustion engine. The installation of the intake module is accompanied at the same time by the installation of the air duct element, the cylinder head cover, the lubricant separation device, and the cooling device. It is thus apparent that additional time-consuming and costly installation steps for separately installing the lubricant separation device, the cylinder head cover, and the cooling device are not provided and are not necessary.

Due to its modular construction, the intake module according to the invention also has advantageous testing capability with regard to a desired function of the intake module. In other words, the components of the intake module, i.e., at least the air duct element, the cylinder head cover, the lubricant separation device, and the cooling device, may be tested in combination for a desired functionality. Separate testing of the components is not provided and is not necessary. This minimizes the time and cost expenditure for carrying out the testing of the functionality or meeting the function of the intake module. Due to the very low number of individual parts of the intake module according to the invention, very simple logistics of handling are also achieved. The intake module according to the invention also has very small space requirements as well as a low weight due to the integration of the components into the intake module.

Another advantage is that the intake module has only very small tolerances due to a very low number of interfaces. In addition, the number of external lines, i.e., lines to be connected to the intake module from the outside, may be kept small. This likewise results in low weight, and solves and/or avoids package problems, particularly in a space-critical area such as in an engine compartment of the motor vehicle designed as a passenger vehicle, for example.

The lubricant separation device is used to separate lubricant, in particular oil, from a lubricant-air mixture or a lubricant-gas mixture. The lubricant separation device may be used, for example, within the scope of crankcase venting of the internal combustion engine in which so-called blow-by gas is exhausted from a crankcase of the internal combustion engine. The blow-by gas is formed at least essentially by the lubricant-air mixture or lubricant-gas mixture composed of lubricant and gas from the crankcase. Within the scope of crankcase venting, the gas or air component of the blow-by gas is returned to the air side of the internal combustion engine. The return also of the lubricant component of the blow-by gas to the air side is not desirable. To avoid this, the lubricant separation device, which at least predominantly separates the lubricant component from the gas component of the blow-by gas, is provided, so that at least essentially only the gas component may be led to the air side of the internal combustion engine and into at least one combustion chamber of the internal combustion engine. This keeps the emissions of the internal combustion engine particularly low.

The cooling device functions, for example, as a charge air cooler for cooling the air that is compressed by means of a compressor of an exhaust gas turbocharger. The supercharging rate of the engine may be increased by cooling the compressed and thus heated air. The internal combustion engine may thus be operated in a particularly efficient manner that thus optimizes fuel consumption.

It is thus apparent that the intake module according to the invention has a very high level of functional integration. The recirculation of the blow-by gas to the air side and thus into an intake tract of the internal combustion engine is particularly simple, since control and regulation elements for controlling and regulating the recirculation may be situated in a particularly close proximity to a withdrawal point at which the blow-by gas is withdrawn, and also to a return point at which the blow-by gas or its gas component is introduced. The withdrawal point is situated, for example, in a lubricant chamber or oil chamber of the cylinder head. The return point is preferably situated in the direction of flow of the air, downstream from the cooling device (charge air cooler) or in a clean air line to the exhaust gas turbocharger.

In one advantageous embodiment of the invention, a first connecting flange surface of the air duct element, via which the air duct element is to be connected to the cylinder head, and a second connecting flange surface of the cylinder head cover, via which the cylinder head cover is to be connected to the cylinder head, are situated at least essentially in a shared plane. In this way, the intake module according to the invention may be installed in a particularly simple manner, and produced in a time-saving and thus cost-effective manner. Correspondingly, a third connecting flange surface corresponding to the first connecting flange surface as well as a fourth connecting flange surface of the cylinder head corresponding to the second connecting flange surface are likewise at least essentially situated in a shared plane. The intake module may thus be installed on the cylinder head without complicated adapter elements. Particularly simple installation of the intake module according to the invention is provided in such a cylinder head in which the third connecting flange surface is integrated into the fourth connecting flange surface (or vice versa).

In another advantageous embodiment, the air duct element includes an air distributor by means of which the air may be distributed over a plurality of combustion chambers, in particular cylinders, of the internal combustion engine. The air distributor has a collection chamber, for example, in which, for example, the air which is compressed and to be supplied to the internal combustion engine is initially collected. A plurality of air channels corresponding to the combustion chambers and into which, for example, the compressed air from the collection chamber may flow, and from which the air may flow into the combustion chambers, branches off from the collection chamber. This provides a particularly high level of functional integration of the intake module.

It has also been shown to be advantageous when the cooling device is situated in a receiving chamber delimited partially by the air duct element and partially by the cylinder head cover. In other words, the cylinder head cover and the air duct element are connected to one another to form the receiving chamber, the cooling device being situated in the receiving chamber. The receiving chamber may thus be provided in a simple, cost-effective manner with only a small number of parts, which keeps the space requirements and the costs of the intake module low.

In another advantageous embodiment of the invention, at least one air line via which air is suppliable to the internal combustion engine is delimited partially by the air duct element and partially by the cylinder head cover. This results in a particularly cost-effective and compact design of the intake module.

The cooling device is preferably inserted into the intake module, in particular into the receiving chamber. The cooling device may thus be installed in a time- and cost-saving manner, resulting in time- and cost-optimized assembly of the overall internal combustion engine. This may take place in the longitudinal direction as well as in the transverse direction, relative to the main direction of extension of the cooling device.

In one particularly preferred embodiment, parts of the housing, in particular the upper housing part and the lower housing part, are connected to one another by screwing and/or welding, and/or gluing and/or riveting, and/or these parts are at least partially formed together as one piece. A particularly permanently seal-tight and easy connection of the housing parts to one another may be achieved using these connection technologies. In particular for connecting housing parts made of plastics, metallic connecting elements may be at least partially dispensed with when these parts are welded. The overall weight of the system may thus be kept low.

The invention also encompasses an internal combustion engine having an intake module according to the invention. The internal combustion engine includes a cylinder head to which the intake module according to the invention is mounted by means of screws, for example.

Further advantages, features, and particulars of the invention result from the following description of one preferred exemplary embodiment and with reference to the drawings. The features and feature combinations mentioned above in the description as well as the features and feature combinations mentioned below in the description of the figures and/or only shown in the figures may be used not only in the particularly stated combination, but also in other combinations or alone without departing from the scope of the invention.

DETAILED DESCRIPTION

Figure 1:
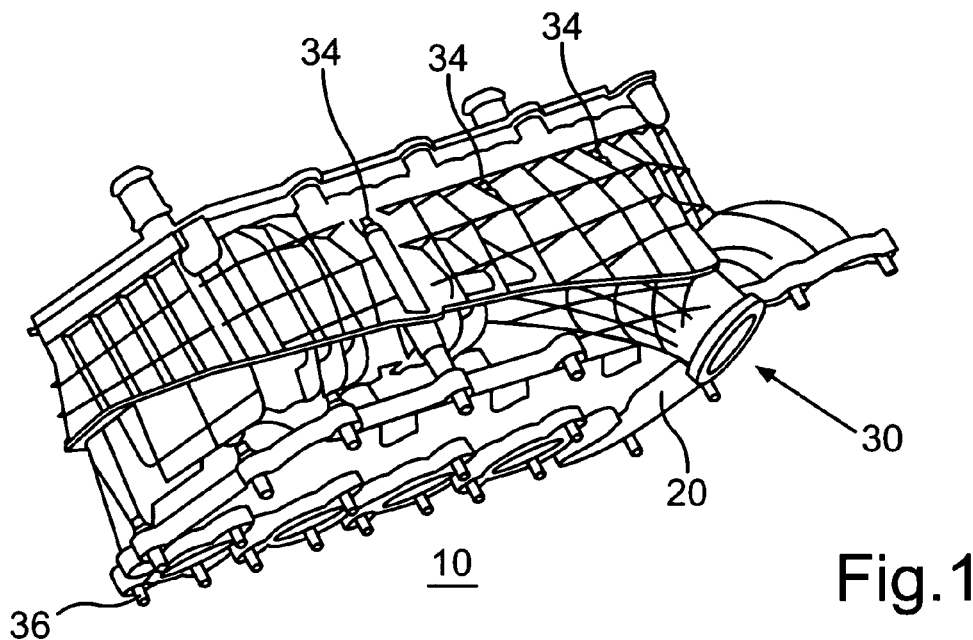
FIG. 1 shows a schematic perspective view of an intake module for an internal combustion engine designed as a reciprocating piston internal combustion engine, having an air duct element, a cylinder head cover, an oil separator, and a charge air cooler which are integrated into the intake module.

FIG. 1 shows an intake module 10 for an internal combustion engine designed as a reciprocating piston internal combustion engine of a motor vehicle, in particular a passenger vehicle. As is apparent in conjunction with FIG. 2, the intake module 10 includes an air duct element 12 by means of which air is to be supplied to the internal combustion engine. The air duct element 12 is therefore also referred to as an intake manifold, since the internal combustion engine may draw in air via the air duct element.

The intake module 10 also includes a cylinder head cover 14 by means of which a cylinder head of the internal combustion engine is to be at least partially covered, and which is designed in one piece with the air duct element 12. Associated with the air duct element 12 are air channels 16 via which the air is able to flow into cylinders of the internal combustion engine, and which are partially delimited on the one hand by an upper housing part 18 of the intake module 10 and on the other hand by a lower housing part 20 of the intake module 10. The cylinder head cover 14 is formed by the lower housing part 20.

Figure 2:
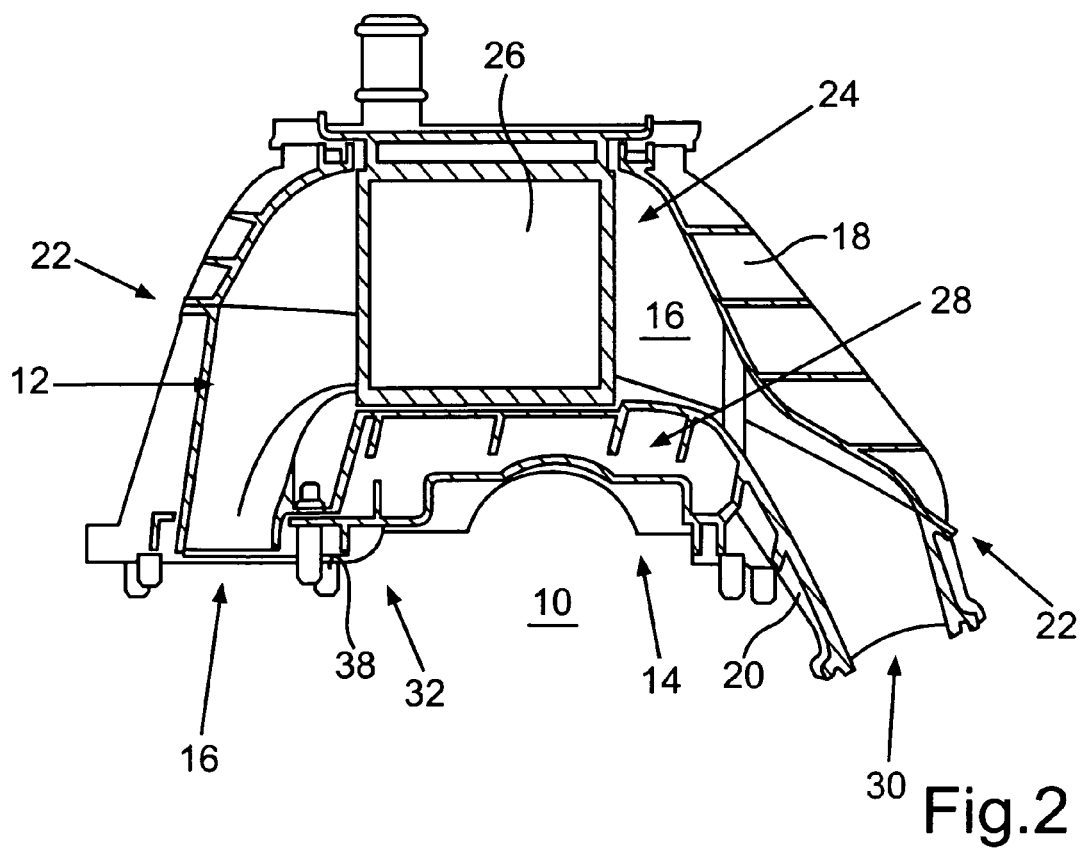
FIG. 2 shows a schematic sectional view of the intake module according to FIG. 1.

As is apparent from FIGS. 1 and 2, the upper housing part 18 and the lower housing part 20 are connected to one another via respective connecting flanges 22, forming a receiving chamber 24. In other words, the receiving chamber 24 is delimited partially by the air duct element 12 and partially by the cylinder head cover 14. The cylinder head cover 14 and a housing for accommodating the charge air cooler 26 are partially formed by the lower housing part 20.

Situated in the receiving chamber 24 is a charge air cooler 26 by means of which the air to be supplied to the internal combustion engine and compressed by means of a compressor of an exhaust gas turbocharger, and thus heated, is to be cooled. Particularly simple assembly is provided by inserting the charge air cooler 26 into the receiving chamber 24 of the intake module 10. This means that the cylinder head cover 14, the air duct element 12, and the charge air cooler 26 are integrated into the intake module 10.

In addition, an oil separation area 28 for providing oil separation within the scope of crankcase venting is integrated into the intake module 10. So-called blow-by gas is exhausted from a crankcase of the internal combustion engine by means of the crankcase venting. The blow-by gas is formed as a mixture of oil and gas. The oil component is resupplied to an oil circuit of the internal combustion engine, while the gas component is introduced into an intake tract of the internal combustion engine and thus supplied to the cylinders. The oil separation is used for achieving this separate supply by means of the oil separation area 28, via which the oil component is at least predominantly separated from the gas component of the blow-by gas.

Also associated with the air duct element 12 is a connector 30 via which the air that is compressed by the compressor and thus heated may be supplied to the receiving chamber 24 and thus to the charge air cooler 26. In addition, the air duct element 12 includes a charge air distributor 32 by means of which the compressed air and air that is cooled by means of the charge air cooler 26 is to be supplied to the cylinders of the internal combustion engine.

Due to the integration of the air duct element 12, the cylinder head cover 14, the charge air cooler 26, and the oil separation area 28 into the intake module 10, the intake module has a high level of functional integration, very low space requirements, and low weight. The intake module 10 may be fastened as a modular part to the cylinder head, so that this fastening is accompanied at the same time by the fastening of the air duct element 12, the cylinder head cover 14, the charge air cooler 26, and the oil separation area 28. The assembly costs for the internal combustion engine may thus be kept low.

The intake module 10 thus represents a highly integrated intake module 10 that may be advantageously used in internal combustion engines in an in-line configuration, and the installation space requirements may be kept particularly low, especially for in-line engines.

For connecting the upper housing part 18 to the lower housing part 20, screws 34 are used which in each case pass through through openings of the upper housing part 18 and the lower housing part 20 and are screwed into the cylinder head. The overall intake module 10 is fastened to the cylinder head by means of the screws 34. For further connection of the intake module 10 to the cylinder head, additional screws 36 are used which in each case pass through through openings of the lower housing part 20. It is likewise conceivable for the upper housing part 30 and the lower housing part 34 to be connected to one another by some other type of screw connection, weld connection, adhesive connection, and/or rivet connection, and/or for these parts to be at least partially formed together as one piece.

A first connecting flange surface, via which the air duct element 12 or the intake manifold is to be connected to the cylinder head, and a second connecting flange surface, via which the cylinder head cover 14 is to be connected to the cylinder head, are advantageously situated in an at least essentially shared plane 38. A particularly simple assembly and production situation for the intake module 10 is thus provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Intake module
12 Air duct element
14 Cylinder head cover
16 Air channel
18 Upper housing part
20 Lower housing part
22 Connecting flange
24 Receiving chamber
26 Charge air cooler
28 Oil separation area
30 Connector
32 Charge air distributor
34 Screw
36 Screw
38 Plane

The invention claimed is:

1. An intake module for a motor vehicle internal combustion engine, the intake module comprising:
   an air duct element configured to supply air to the internal combustion engine of the motor vehicle;
   a cylinder head cover, connected to the air duct element, wherein the cylinder head cover at least partially covers a cylinder head of the internal combustion engine of the motor vehicle;
   a lubricant separation device;
   a cooling device configured to cool the air,
   wherein the air duct element, cylinder head cover, lubricant separation device and cooling device form a single part;
   a first connecting flange surface via which the air duct element is connected to the cylinder head; and
   a second connecting flange surface via which the cylinder head cover is connected to the cylinder head,
   wherein the first and second connecting flange surfaces are situated at least essentially in a shared plane.

2. The intake module of claim 1, wherein the air duct element includes an air distributor configured to distribute the air over a plurality of combustion chambers of the internal combustion engine.

3. The intake module of claim 1, wherein the cooling device is situated in a receiving chamber that is delimited partially by the air duct element and partially by the cylinder head cover.

4. The intake module of claim 1, further comprising:
   at least one air line configured to supply the air to the internal combustion engine, wherein the at least one air line is delimited partially by the air duct element and partially by the cylinder head cover.

5. The intake module of claim 1, wherein the cooling device is arranged in its longitudinal direction in the intake module.

6. An intake module for a motor vehicle internal combustion engine, the intake module comprising:

an air duct element configured to supply air to the internal combustion engine of the motor vehicle;

a cylinder head cover, connected to the air duct element, wherein the cylinder head cover at least partially covers a cylinder head of the internal combustion engine of the motor vehicle;

a lubricant separation device; and a cooling device configured to cool the air, wherein the air duct element, cylinder head cover, lubricant separation device and cooling device form a single part, wherein the single part has an upper housing part and a lower housing part, wherein the upper housing part and the lower housing part are connected to one another by screwing, welding, gluing, or riveting, and wherein the air duct element, cylinder head cover, lubricant separation device and cooling device are disposed within the upper housing part and the lower housing part.

7. An intake module for a motor vehicle internal combustion engine, the intake module comprising:

an air duct element configured to supply air to the internal combustion engine of the motor vehicle;

a cylinder head cover, connected to the air duct element, wherein the cylinder head cover at least partially covers a cylinder head of the internal combustion engine of the motor vehicle;

a lubricant separation device; and a cooling device configured to cool the air, wherein the air duct element, cylinder head cover, lubricant separation device and cooling device form a single part, wherein the single part has an upper housing part and a lower housing part, wherein the upper housing part and the lower housing part are at least partially formed together as one piece, and wherein the air duct element, cylinder head cover, lubricant separation device and cooling device are disposed within the upper housing part and the lower housing part.

8. An internal combustion engine, comprising:

a cylinder head; and an intake module, which comprises an air duct element configured to supply air to the cylinder head;

a cylinder head cover, connected to the air duct element, wherein the cylinder head cover at least partially covers the cylinder head;

a lubricant separation device;

a cooling device configured to cool the air, wherein the air duct element, cylinder head cover, lubricant separation device and cooling device form a single part;

a first connecting flange surface via which the air duct element is connected to the cylinder head; and a second connecting flange surface via which the cylinder head cover is connected to the cylinder head, wherein the first and second connecting flange surfaces are situated at least essentially in a shared plane.

9. The internal combustion engine of claim 8, wherein the air duct element includes an air distributor configured to distribute the air over a plurality of combustion chambers of the internal combustion engine.

10. The internal combustion engine of claim 8, wherein the cooling device is situated in a receiving chamber that is delimited partially by the air duct element and partially by the cylinder head cover.

11. The internal combustion engine of claim 8, wherein the intake module further comprises:

at least one air line configured to supply the air to the internal combustion engine, wherein the at least one air line is delimited partially by the air duct element and partially by the cylinder head cover.

12. The internal combustion engine of claim 8, wherein the cooling device is arranged in its longitudinal direction in the intake module.

13. An internal combustion engine, comprising:

a cylinder head; and an intake module, which comprises an air duct element configured to supply air to the cylinder head;

a cylinder head cover, connected to the air duct element, wherein the cylinder head cover at least partially covers the cylinder head;

a lubricant separation device; and a cooling device configured to cool the air, wherein the air duct element, cylinder head cover, lubricant separation device and cooling device form a single part, wherein the single part has an upper housing part and a lower housing part, wherein the upper housing part and the lower housing part are connected to one another by screwing, welding, gluing, or riveting, and wherein the air duct element, cylinder head cover, lubricant separation device and cooling device are disposed within the upper housing part and the lower housing part.

14. An internal combustion engine, comprising:

a cylinder head; and an intake module, which comprises an air duct element configured to supply air to the cylinder head;

a cylinder head cover, connected to the air duct element, wherein the cylinder head cover at least partially covers the cylinder head;

a lubricant separation device; and a cooling device configured to cool the air, wherein the air duct element, cylinder head cover, lubricant separation device and cooling device form a single part, wherein the single part has an upper housing part and a lower housing part, wherein the upper housing part and the lower housing part are at least partially formed together as one piece, and wherein the air duct element, cylinder head cover, lubricant separation device and cooling device are disposed within the upper housing part and the lower housing part.

* * * * *